(12) United States Patent
Oi

(10) Patent No.: US 11,699,971 B2
(45) Date of Patent: Jul. 11, 2023

(54) ELECTRIC VEHICLE AND DIAGNOSIS METHOD FOR ELECTRIC VEHICLE

(71) Applicant: TOYOTA JIDOSHA KABUSHIKI KAISHA, Toyota (JP)

(72) Inventor: Shohei Oi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

(21) Appl. No.: 17/493,244

(22) Filed: Oct. 4, 2021

(65) Prior Publication Data

US 2022/0109391 A1 Apr. 7, 2022

(30) Foreign Application Priority Data

Oct. 6, 2020 (JP) .................................. 2020-169297

(51) Int. Cl.
| | |
|---|---|
| *H02P 27/06* | (2006.01) |
| *H02P 29/028* | (2016.01) |
| *B60L 50/51* | (2019.01) |

(52) U.S. Cl.
CPC .............. *H02P 27/06* (2013.01); *B60L 50/51* (2019.02); *H02P 29/028* (2013.01); *B60L 2210/40* (2013.01); *B60L 2240/421* (2013.01); *B60L 2240/427* (2013.01); *B60L 2240/429* (2013.01); *B60L 2240/529* (2013.01)

(58) Field of Classification Search
CPC ........ H02P 27/06; H02P 29/028; B60L 50/51; B60L 2240/421; B60L 2240/427; B60L 2240/429; B60L 2240/529; B06L 2210/40

USPC ....................................................... 318/400.3
See application file for complete search history.

(56) References Cited

U.S. PATENT DOCUMENTS

| | | | |
|---|---|---|---|
| 2005/0050965 A1* | 3/2005 | Zaremba | B60L 15/025 73/862.08 |
| 2012/0212169 A1* | 8/2012 | Wu | H02P 21/141 318/432 |
| 2013/0038342 A1* | 2/2013 | Nozaki | H02P 29/0241 324/750.3 |
| 2015/0102782 A1* | 4/2015 | Nakayama | H02J 11/00 322/21 |
| 2015/0231972 A1* | 8/2015 | Oi | B60L 3/04 307/10.1 |
| 2019/0006979 A1* | 1/2019 | Suzuki | B62D 5/0463 |
| 2019/0288585 A1* | 9/2019 | Lee | H02P 21/08 |
| 2019/0334466 A1* | 10/2019 | Arai | H02P 27/12 |

(Continued)

FOREIGN PATENT DOCUMENTS

| | | | | |
|---|---|---|---|---|
| JP | 2004-096933 A | | 3/2004 | |
| JP | 2007244070 A | * | 9/2007 | .............. B60L 11/14 |
| JP | 2018-113734 A | | 7/2018 | |

*Primary Examiner* — Kawing Chan
(74) *Attorney, Agent, or Firm* — Dinsmore & Shohl LLP

(57) ABSTRACT

An electric vehicle includes a traction motor, an inverter that supplies the motor with an alternating current, three current sensors that respectively measure current of each phase of the alternating current output by the inverter, the alternating current being a three phase alternating current; and a controller that controls the motor through the inverter. The controller is configured to, when one of the current sensors becomes unusable, identify the unusable current sensor while controlling the motor with a d-axis voltage command value set to zero and a q-axis voltage command value set to a non-zero value.

10 Claims, 4 Drawing Sheets

(56) References Cited

U.S. PATENT DOCUMENTS

| 2020/0021217 A1* | 1/2020 | Hano ................. H02M 1/0009 |
| 2020/0119674 A1* | 4/2020 | Tsuchimoto ........... G01R 31/42 |
| 2020/0220479 A1* | 7/2020 | Miyazaki .............. H02P 29/032 |
| 2021/0175835 A1* | 6/2021 | Zhang ................ H02P 29/0241 |

* cited by examiner

ELECTRIC VEHICLE AND DIAGNOSIS METHOD FOR ELECTRIC VEHICLE

CROSS-REFERENCE TO RELATED APPLICATION

This application claims priority to Japanese Patent Application No. 2020-169297 filed on Oct. 6, 2020, incorporated herein by reference in its entirety.

BACKGROUND

1. Technical Field

A technique to be disclosed by this specification relates to an electric vehicle equipped with a traction motor and a diagnosis method for the electric vehicle. In particular, the technique relates to an electric vehicle having three current sensors that measure three phase alternating currents supplied to the motor, and prevents the motor from generating unnecessary torque while identifying a current sensor that has become unusable. The term "electric vehicle" in this specification covers a hybrid vehicle equipped with both a motor and an engine, as well as a fuel cell electric vehicle.

2. Description of Related Art

An electric vehicle is equipped with a three-phase alternating-current motor as a traction motor and also an inverter that converts electricity from a direct-current power source into three phase alternating currents. To simplify the description, the three-phase alternating-current motor will be hereinafter referred to simply as a motor.

Current feedback is necessary for accurate control of the traction motor. Since the sum of three phase alternating currents is always zero, three-phase current feedback can be realized if two phase currents of the three phase currents can be measured. However, to detect failure of a current sensor, common electric vehicles have three current sensors and can measure all the three phase alternating currents.

Japanese Unexamined Patent Application Publication No. 2018-113734 discloses a motor control device (a control device for a motor of an electric vehicle) and a technique of identifying a failed current sensor and continuing three-phase feedback control using the other two normal current sensors. A technique of finding a failed current sensor is shown, for example, in Japanese Unexamined Patent Application Publication No. 2004-96933.

SUMMARY

Identifying an unusable current sensor requires applying a current in each phase and obtaining measurements of the current sensors. When a problem with a current sensor (or a signal line or a power line) arises while the vehicle is traveling, haphazardly applying a current to identify the unusable current sensor may cause the motor to output unnecessary torque. Torque that is not intended by the driver can cause discomfort to the driver. This specification provides a technique of, when one of three current sensors for current feedback becomes unusable, preventing a motor from generating unnecessary torque while identifying the unusable current sensor.

Even when a current sensor itself has not failed, the current sensor becomes unusable if a signal line connecting the current sensor to a controller or a power line through which electricity is supplied to the current sensor breaks. Hereinafter, instead of the expression "a failed current sensor," the expression "an unusable current sensor" will be used for a broader sense.

An electric vehicle according to a first aspect disclosed by this specification includes a traction motor, an inverter that supplies the motor with an alternating current, three current sensors that respectively measure current of each phase of the alternating current output by the inverter, the alternating current being a three phase alternating current, and a controller that controls the motor through the inverter. The controller is configured to, when one of the current sensors becomes unusable, identify the unusable current sensor while controlling the motor with a d-axis voltage command value set to zero and a q-axis voltage command value set to a non-zero value. When the d-axis voltage command value is set to zero and the q-axis voltage command value is set to a non-zero value, a current flows to the motor but the motor does not generate torque. When the angular speed of the motor is higher than a predetermined lower-limit angular speed, the above aspect is effective to provide a state in which a current flows to the motor but the motor does not generate torque. The reason for this will be described in an embodiment.

In the above aspect, the controller may be configured to, when one of the current sensors becomes unusable in a state where an angular speed of the motor is lower than a predetermined lower-limit angular speed, identify the unusable current sensor while controlling the motor with the d-axis voltage command value set to zero, the q-axis voltage command value set to a non-zero value, and a d-axis current being a positive value. Thus, the torque generated by the motor may not become exactly zero but the generated torque can be reduced. The reason for this will also be described in the embodiment.

In the above aspect, the controller may be configured to give the q-axis voltage command value as a value obtained by adding the product of the angular speed of the motor and the intensity of a magnetic field of a rotor of the motor to a constant that is larger than a predetermined positive lower-limit constant.

In the above aspect, the controller may determine that one of the current sensors is unusable when the sum of measurements of the three current sensors is not zero.

In the above aspect, the controller may be configured to, from a first measurement of a first current sensor and a second measurement of a second current sensor of the current sensors, estimate a third estimation of a current of a phase corresponding to a third current sensor of the current sensors. This estimation may be based on Kirchhoff's law. The controller may be configured to, when a sum of square of the first measurement, square of the second measurement and square of the third estimation is equal to three halves of a square of an input current to the inverter, determine that the first current sensor and the second current sensor are usable. The controller may be configured to, when the sum of square of the first measurement, square of the second measurement and square of the third estimation is different from three halves of the square of the input current, determine that one of the first current sensor and the second current sensor is unusable. The unusable current sensor can be identified by making this comparison using measurements of current sensors for a u-phase and a v-phase and measurements of current sensors for the u-phase and a w-phase.

A diagnosis method according to a second aspect disclosed by the specification is a diagnosis method for an electric vehicle including a traction motor, an inverter that supplies the motor with an alternating current, three current sensors that respectively measure current of each phase of the alternating current output by the inverter, the alternating current being a three phase alternating current, and a controller that controls the motor through the inverter. The diagnosis method includes, when one of the current sensors becomes unusable, identifying the unusable current sensor while controlling the motor with a d-axis voltage command value set to zero and a q-axis voltage command value set to a non-zero value.

The controller may be configured to, after identifying the unusable current sensor, estimate the phase current corresponding to the unusable current sensor from the measurements of the two usable current sensors, and resumes current feedback control. While the unusable current sensor is identified, the electric vehicle travels by inertial force alone, but after the unusable current sensor is identified, the electric vehicle can output torque according to the accelerator operation amount. While the unusable current sensor is identified, the motor does not generate torque that is not intended by the driver and therefore does not cause discomfort to the driver.

Details and further improvements of the technique disclosed by this specification will be described below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
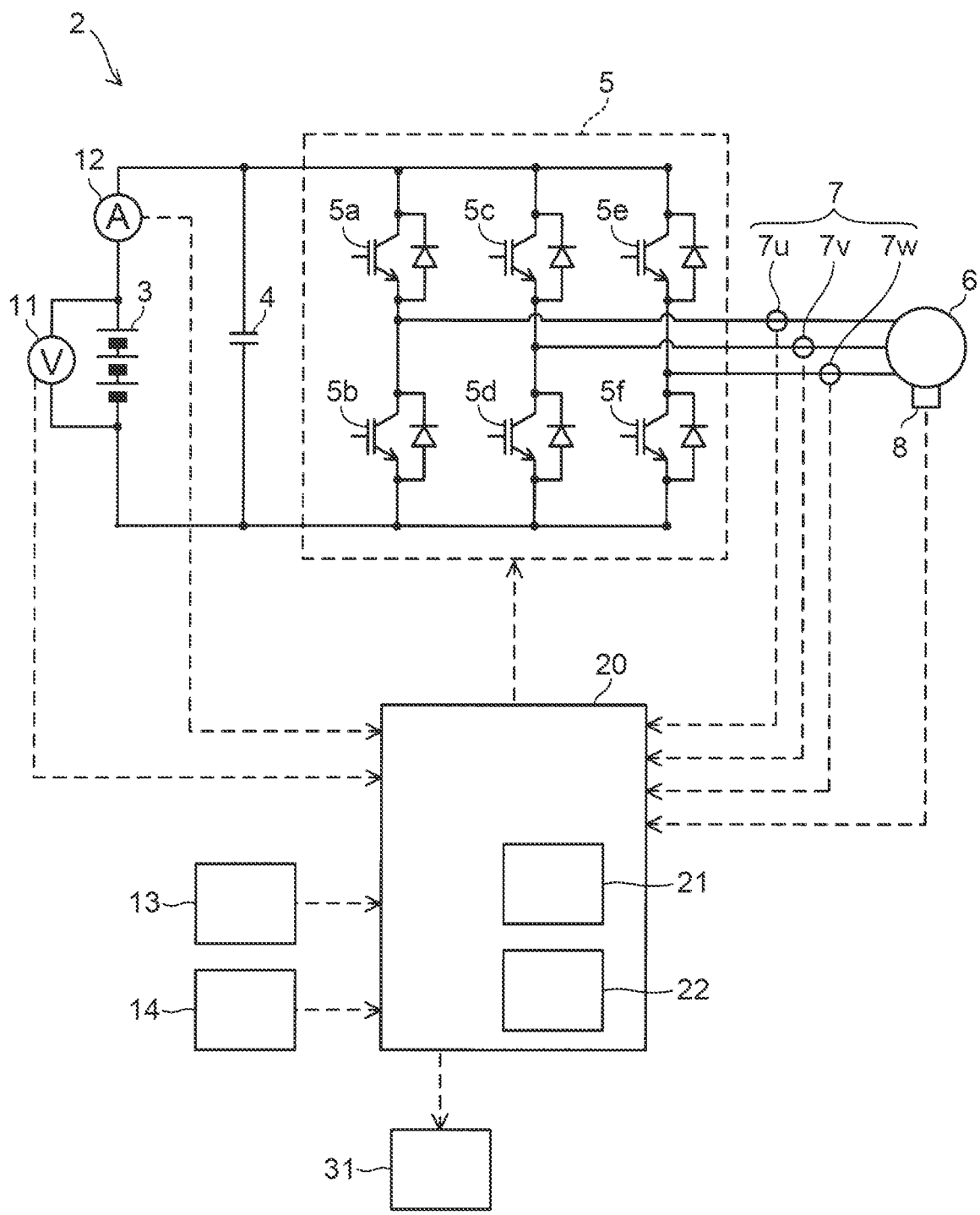
FIG. 1 is a block diagram of a drive system of an electric vehicle of an embodiment.

An electric vehicle 2 of an embodiment will be described with reference to the drawings. FIG. 1 is a block diagram of a drive system of the electric vehicle 2. The electric vehicle 2 includes a power source 3, an inverter 5, a traction motor 6, and a controller 20. The power source 3 is a lithium-ion battery and can output electricity at a voltage of 100 volts or higher. The motor 6 is a three-phase alternating-current motor. Electricity (direct-current electricity) output from the power source 3 is converted into alternating-current electricity by the inverter 5 and supplied to the motor 6. A capacitor 4 that reduces pulsation of a current (voltage) is connected between the power source 3 and the inverter 5.

The electric vehicle 2 includes a voltage sensor 11 that measures the voltage of the power source 3 and a current sensor 12 that measures the current output from the power source 3. Measurements of the voltage sensor 11 and the current sensor 12 are sent to the controller 20 to be described later.

The inverter 5 includes six switching elements 5a to 5f. The six switching elements 5a to 5f are connected in series in twos. Three sets of series connections are connected in parallel. One diode is connected in reverse parallel to each of the switching elements 5a to 5f. The controller 20 controls the motor 6 through the inverter 5. A voltage converter may be connected between the power source 3 and the inverter 5.

The electric vehicle 2 further includes three current sensors 7 (7u, 7v, 7w). The current sensors 7 measure three phase alternating currents flowing between the inverter 5 and the motor 6. The current sensor 7u measures a u-phase current. Similarly, the current sensor 7v (7w) measures a v-phase current (a w-phase current). Measurements of the current sensors 7 are also input into the controller 20.

The controller 20 includes a central processing unit (CPU) 21 and a memory 22. The memory 22 stores various pieces of data in addition to programs to be executed by the CPU 21. Examples of the data stored in the memory 22 include a map (or a relational expression) that is used to derive command values from a target torque of the motor 6.

An instrument panel 31 is connected to the controller 20. The controller 20 causes the instrument panel 31 to display a vehicle speed and a current state of the electric vehicle 2. When an abnormality occurs in the current sensors 7, the controller 20 causes the instrument panel 31 to turn a warning light on.

The controller 20 acquires the vehicle speed from a vehicle speed sensor 13. The controller 20 acquires an accelerator operation amount from an accelerator sensor 14. The motor 6 has an angle sensor 8, and the controller 20 obtains an electrical angle and an angular speed of the motor 6 from measurement data of the angle sensor 8.

Based on the measurements of the vehicle speed sensor 13 and the accelerator sensor 14, the controller 20 calculates the target torque of the motor 6 and controls the inverter 5 (motor 6) such that the output torque of the motor 6 follows the target torque. The controller 20 determines a current command value for the inverter 5 based on the target torque. The controller 20 determines current command values for the respective three phases. The controller 20 performs feedback control using the measurements of the current sensors 7 such that the currents (three phase alternating currents) output from the inverter 5 follow the corresponding current command values.

The current sensors 7 will be further described. According to Kirchhoff s law, the sum of three phase alternating currents is always zero. Therefore, if two phase currents of three phase currents can be measured, the other phase current can be estimated. However, in case of failure of the current sensors 7, the electric vehicle 2 has current sensors for the respective three phases and can measure all the phase currents.

The controller 20 adds up the measurements of the three current sensors 7u, 7v, 7w, and when the sum is not zero, determines that one of the three current sensors 7 is unusable. The meaning of a current sensor being unusable covers not only a case where the current sensor has failed but also a case where a signal line or a power supply line to the current sensor has broken.

When the controller 20 determines that one of the three current sensors 7 is unusable, the controller 20 identifies the unusable current sensor, and from the measurements of the two normal current sensors, estimates the phase current corresponding to the other current sensor. The controller 20 continues the current feedback control using the measurements of the two normal current sensors and the estimated current value. While identifying the unusable current sensor, the controller 20 controls the inverter 5 such that the motor 6 does not output torque, so as to avoid causing discomfort to the driver.

Figure 2:
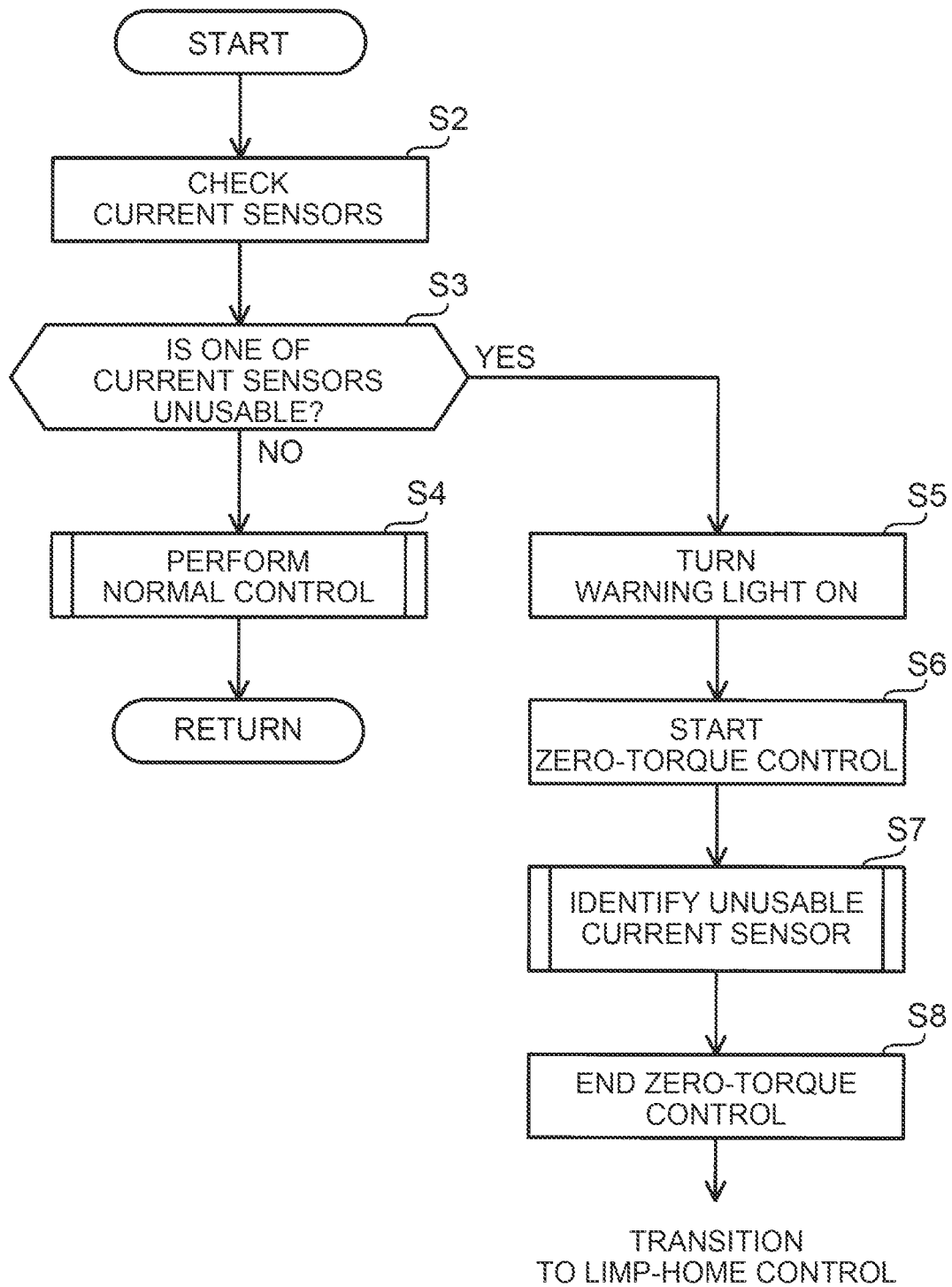
FIG. 2 is a flowchart of motor control executed by a controller.

FIG. 2 is a flowchart of motor control executed by the controller 20. The controller 20 repeats the process of FIG. 2 on a regular cycle. First, the controller 20 checks the three current sensors 7 (step S2). As described earlier, the controller 20 adds up the measurements of the three current sensors 7, and when the sum is not zero, determines that one of the current sensors is unusable. When the controller 20 determines that all the current sensors 7 are usable, the controller 20 controls the motor 6 (inverter 5) by normal control (step S3: NO, step S4). The specific process of the normal control will be described later.

When the controller 20 determines that one of the current sensors 7 is unusable, the controller 20 causes the instrument panel 31 to turn the warning light on (step S3: YES, step S5). Then, the controller 20 starts zero-torque control instead of the normal control (step S6). The zero-torque control refers to controlling the inverter 5 such that the motor 6 does not output torque regardless of the accelerator operation amount. The zero-torque control will be described in detail later.

While performing the zero-torque control, the controller 20 identifies the unusable current sensor (step S7). When the controller 20 has identified the unusable current sensor, the controller ends the zero-torque control (step S8) and transitions to limp-home control. The limp-home control refers to executing the current feedback control using the two usable current sensors while keeping the upper-limit output of the motor 6 down. During the limp-home control, the controller 20 controls the instrument panel 31 to turn a warning light on that indicates that there is an abnormality in the travel control system, and display a message that strongly recommends immediately taking the vehicle to a service center.

It takes only a short time to identify an unusable current sensor. During that short time, executing the zero-torque control causes less discomfort to the driver than outputting torque that is not intended by the driver.

Figure 3:
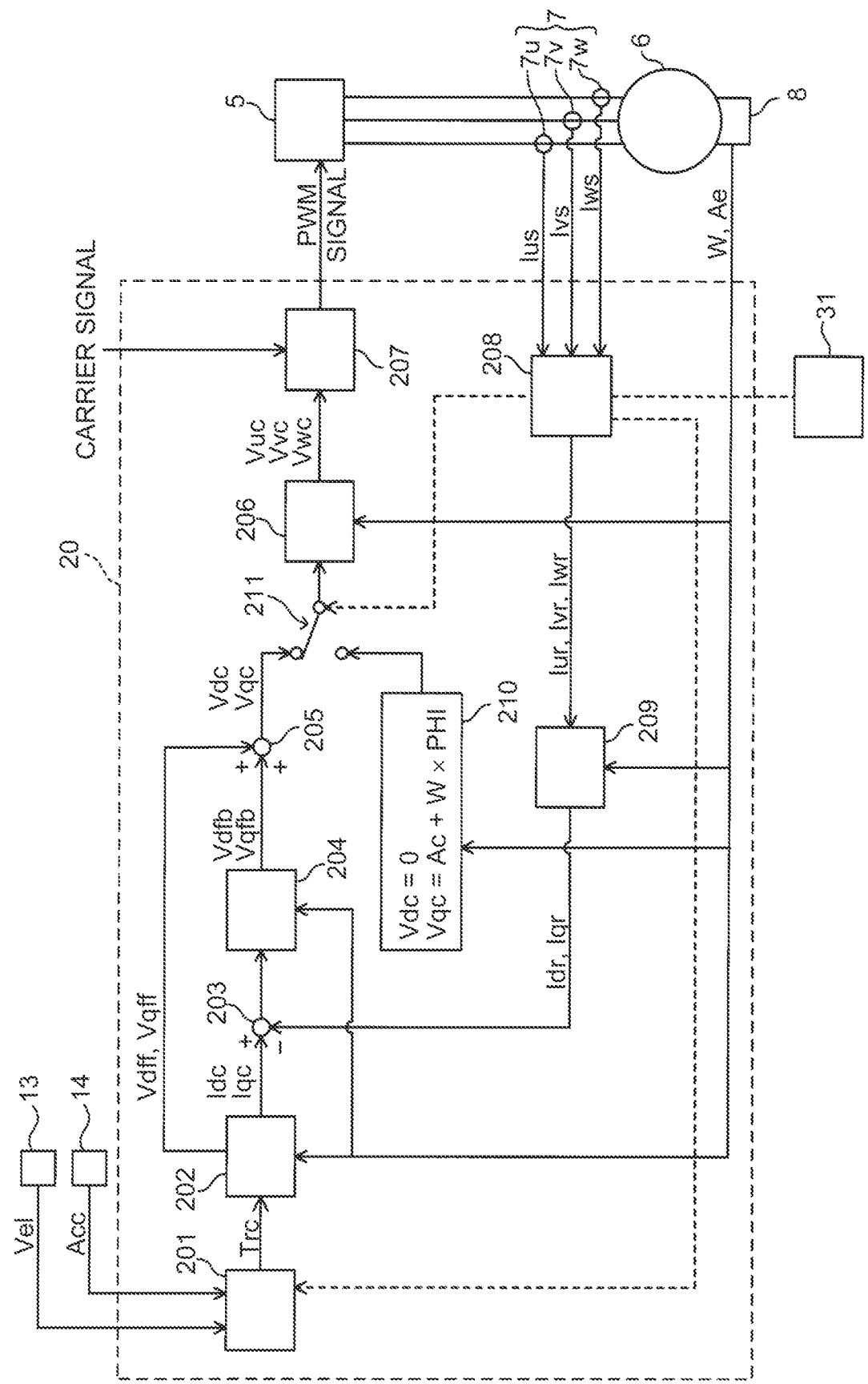
FIG. 3 is a block diagram of the motor control executed by the controller.

FIG. 3 is a block diagram of the motor control executed by the controller 20. FIG. 3 is a diagram to help understand a motor control program and schematically shows the motor control. For example, it is shown that a switch 211 switches between the normal control and the zero-torque control, but in reality, the normal control stops when the controller 20 switches from a program for the normal control to a program for the zero-torque control. Solid-lined rectangles in FIG. 3 represent program modules.

The controller 20 includes a target torque module 201, a command voltage and current module 202, a subtractor 203, a feedback control module 204, an adder 205, a reverse dq conversion module 206, a PWM signal module 207, a current check module 208, a dq conversion module 209, a zero-torque control module 210, and the switch 211. As described earlier, each module is realized as the CPU 21 executes a program stored in the memory 22 of the controller 20.

A vehicle speed Vel measured by the vehicle speed sensor 13 and an accelerator operation amount Acc measured by the accelerator sensor 14 are input into the target torque module 201. The target torque module 201 determines a target torque Trc of the motor 6 from the vehicle speed Vel and the accelerator operation amount Acc. A map (or a relational expression) specifying a relation among the vehicle speed Vel, the accelerator operation amount Acc, and the target torque Trc is stored in the memory 22 of the controller 20, and the target torque module 201 determines the target torque Trc from the measured vehicle speed Vel and accelerator operation amount Acc with reference to the map or using the relational expression.

The target torque Trc is sent to the command voltage and current module 202. Based on the target torque Trc, the command voltage and current module determines a d-axis feedforward voltage Vdff, a q-axis feedforward voltage Vqff, a d-axis current command value Idc, and a q-axis current command value Iqc. The d-axis feedforward voltage Vdff and the q-axis feedforward voltage Vqff are command voltages for making the output torque of the motor 6 quickly approach the target torque Trc. The d-axis current command value Idc and the q-axis current command value Iqc are used for feedback control of the current of the motor 6 obtained from the current sensors 7. The feedback control will be described later.

An electrical angle Ae of the motor 6 is also used in converting the target torque Trc into the d-axis feedforward voltage Vdff, the q-axis feedforward voltage Vqff, the d-axis current command value Idc, and the q-axis current command value Iqc. The electrical angle Ae is obtained from the angle sensor 8 mounted on the motor 6. A relation between the target torque Trc and the d-axis feedforward voltage Vdff etc. is specified by a map (or a relational expression) that includes the electrical angle Ae as a parameter. This map (or relational expression) is also stored in the memory 22 in advance. The command voltage and current module determines the d-axis feedforward voltage Vdff etc. based on the target torque Trc with reference to the map (or the relational expression).

The d-axis current command value Idc (q-axis current command value Iqc) is sent to the subtractor 203. The subtractor 203 calculates the difference between the d-axis current command value Idc (q-axis current command value Iqc) and an actual d-axis current Idr (q-axis current Iqr) obtained from the measurements of the current sensors 7. This difference is used for the feedback control.

Measurements Ius, Ivs, Iws of the three current sensors 7 ($7u$, $7v$, $7w$) are input into the current check module 208. The current check module adds up the measurements Ius, Ivs, Iws of the three current sensors 7 to obtain the sum. When the sum is zero, the current check module 208 determines that all the current sensors are usable. In this case, the current check module 208 outputs currents Iur, Ivr, Iwr of the respective three phases. The currents Iur, Ivr, Iwr correspond to outputs of the current sensors $7u$, $7v$, $7w$, respectively. Alternatively, one of the three currents Iur, Ivr, Iwr may be a value estimated from the other two currents. Based on Kirchhoff's law, for example, the u-phase current Iur can be obtained by the formula: Iur=−(Ivr+Iwr).

The currents Iur, Ivr, Iwr of the respective three phases are input into the dq conversion module 209. The dq conversion module 209 converts the three phase currents Iur, Ivr, Iwr into the d-axis current Idr and the q-axis current Iqr using the electrical angle Ae of the motor 6. Conversion of three phase currents into d- and q-axis currents is well known and therefore the description thereof will be omitted.

As described earlier, the subtractor 203 calculates the difference between the d-axis current command value Idc and the d-axis current Idr and the difference between the q-axis current command value Iqc and the q-axis current Iqr. The obtained differences are input into the feedback control module 204. The feedback control module 204 determines a d-axis feedback voltage Vdfb and a q-axis feedback voltage Vqfb such that the difference between the d-axis current command value Idc and the d-axis current Idr and the difference between the q-axis current command value Iqc and the q-axis current Iqr become smaller. Alternatively, the feedback control module 204 determines the d-axis feedback voltage Vdfb and the q-axis feedback voltage Vqfb based on control rules of P control, PI control, PID control, etc.

The d-axis feedback voltage Vdfb (q-axis feedback voltage Vqfb) and the d-axis feedforward voltage Vdff (q-axis feedforward voltage Vqff) are added up in the adder 205. As a result of this addition, a d-axis voltage command value Vdc and a q-axis voltage command value Vqc are obtained. The d-axis voltage command value Vdc and the q-axis voltage command value Vqc are converted into voltage command values Vuc, Vvc, Vwc for the respective three phases in the reverse dq conversion module 206. The electrical angle Ae is used as a reference also for this conversion.

The voltage command values Vuc, Vvc, Vwc for the respective three phases are each compared with a carrier signal in the PWM signal module 207 and converted into PWM signals for driving the switching elements (the switching elements 5a to 5f of FIG. 1) of the corresponding phases. An output of the PWM signal module 207, i.e., the PWM signals are respectively sent to the upper-arm switching elements 5a, 5c, 5e of the inverter 5. A complementary signal of the PWM signal for the upper-arm switching element 5a is supplied to a lower-arm switching element (e.g., the switching element 5b).

The normal control has been described so far. When all the three current sensors 7 are usable, the feedforward voltages Vdff, Vqff for the d-axis and the q-axis are determined from the target torque Trc, and the inverter 5 is controlled based on these values, so that the output torque of the motor 6 quickly approaches the target torque Trc. As the feedback control according to the difference between the d-axis current command value Idc (and the q-axis current command value Iqc) obtained from the target torque Trc and the d-axis current Idr (and the q-axis current Iqr) obtained from the motor 6 is executed, the output torque of the motor 6 accurately follows the target torque Trc.

When the controller 20 employs advance-angle control, the reverse dq conversion module 206 converts the d-axis voltage command value Vdc and the q-axis voltage command value Vqc into the voltage command values Vuc, Vvc, Vwc for the respective three phases based on an angle obtained by adding a predetermined advance angle to the electrical angle Ae.

When the current check module 208 finds that the sum of the measurements Ius, Ivs, Iws of the three current sensors 7u, 7v, 7w is not zero, the current check module 208 determines that one of the current sensors 7u, 7v, 7w is unusable. In this case, the current check module 208 controls the switch 211 so as to switch an input terminal of the reverse dq conversion module 206 from the adder 205 to the zero-torque control module 210. The zero-torque control module 210 outputs such a d-axis voltage command value Vdc and a q-axis voltage command value Vqc that a current flows to the motor 6 but that no torque is output therefrom. That is, when one of the current sensors 7u, 7v, 7w is unusable, the controller 20 stops the normal control and transitions to the zero-torque control.

The zero-torque control module 210 gives the d-axis voltage command value Vdc and the q-axis voltage command value Vqc by the following Expression 1:

$$Vdc=0, Vqc=Ce+W\times PHI \qquad \text{[Expression 1]}$$

Here, symbol W represents the angular speed of the motor 6. Symbol Ce represents a positive constant. The constant Ce is larger than a predetermined positive lower-limit constant Cmin. Symbol PHI represents the intensity of a magnetic field of a magnet in the rotor of the motor 6.

As the motor 6 (inverter 5) is controlled based on the voltage command values given by Expression 1, the motor 6 does not output torque while rotating by inertia. While the motor 6 does not generate torque, since the q-axis voltage command value Vqc is not zero, a current flows from the inverter 5 to the motor 6. As a current flows to the motor 6, the current sensors 7 output some measurements. Based on the measurements of the current sensors 7, the current check module 208 identifies the unusable current sensor.

First, how using the voltage command values given by Expression 1 can prevent the motor 6 from generating torque while a current flows to the motor 6 will be described. It is known that there are relations expressed by the following Expression 2 and Expression 3 among a d-axis voltage Vd, a q-axis voltage Vq, a d-axis current Id, and a q-axis current Iq:

$$Vd=R\times Id-W\times Lq\times Iq \qquad \text{[Expression 2]}$$

$$Vq=R\times Iq+W\times Ld\times Id+W\times PHI \qquad \text{[Expression 3]}$$

In Expression 2 and Expression 3, symbol R represents electrical resistance of a coil in a stator of the motor 6. Symbol W represents an angular speed of the rotor of the motor 6. Symbols Ld and Lq represent inductance of the d-axis and inductance of the q-axis of the rotor. Symbol PHI represents the intensity of a magnetic field of a permanent magnet in the rotor.

While the electric vehicle 2 is traveling, the angular speed W has a positive value. If the angular speed W is high, in other words, if the electrical resistance R»the angular speed W holds, the second term on the right side of Expression 2 becomes significantly larger than the first term on the right side, and the first term on the right side can be disregarded. In this case, if the motor 6 is controlled with the d-axis voltage command value Vdc set to zero, the q-axis current Iq becomes zero.

On the other hand, output torque Trq of the motor 6 is given by the following Expression 4:

$$Trq=Pn\times PHI\times Iq+(Ld-Lq)\times Id\times Iq \qquad \text{[Expression 4]}$$

In Expression 4, symbol Pn represents the number of magnetic poles in the rotor. The other symbols are as described earlier.

Expression 4 shows that if the q-axis current Iq is zero, the output torque Trq of the motor 6 also becomes zero. When the motor 6 (inverter 5) is controlled with the d-axis voltage command value set to zero and the q-axis voltage command value set to a non-zero value, a state where a current flows to the motor 6 but no torque is output therefrom can be created.

The above description is based on the condition that the electrical resistance R is sufficiently lower than the angular speed W. This condition corresponds to a case where the angular speed W of the motor 6 is higher than a predetermined lower-limit angular speed Wmin. The lower-limit angular speed Wmin is determined in advance based on the performance of the motor 6.

When the angular speed W is lower than the lower-limit angular speed Wmin, the d-axis voltage command value Vdc is set to zero and the q-axis voltage command value is selected such that the d-axis current Id assumes a positive value. Thus, a current flows to the motor 6 but the output torque Trq can be kept low. Next, the reason for this will be described.

An angle between the q-axis and a rotating magnetic field (a magnetic field generated by the stator) in a dq space will be referred to as an electrical phase angle Be. The intensity of the magnetic field generated by the stator is proportional to a total current flowing through the stator. The total current flowing through the stator will be represented by symbol Ia. The output torque Trq of the motor 6 can be expressed by the following Expression 5 using the electrical phase angle Be and the total current Ia. The motor 6 is an interior permanent magnet synchronous motor (IPMSM).

$$Trq = Pn \times PHI \times Ia \times \cos(Be) + \frac{Pn}{2} \times (Lq - Ld) \times Ia^2 \times \sin(2 \times Be)$$ [Expression 5]

Figure 4:
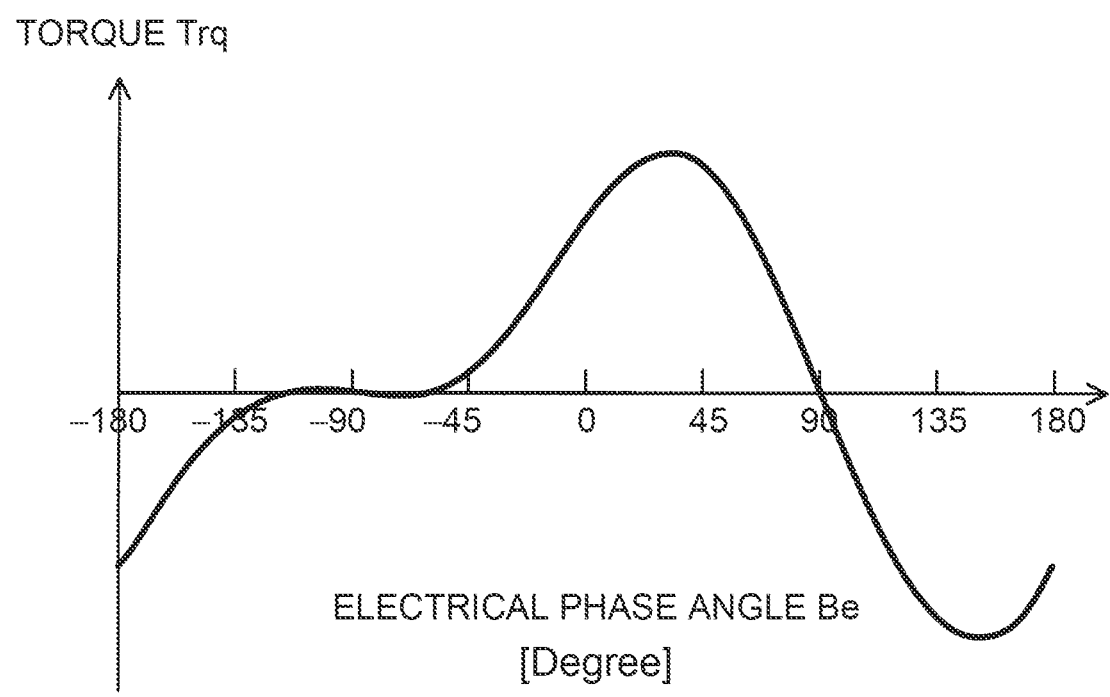
FIG. 4 is a graph showing a relation between an electrical phase angle of a current relative to a q-axis and output torque of a motor.

The first term on the right side of Expression 5 corresponds to magnet torque and the second term on the right side corresponds to reluctance torque. FIG. 4 shows a relation between the electrical phase angle Be and the output torque Trq of the motor 6. It can be seen from FIG. 4 that when the electrical phase angle Be is near −90 degrees, the torque Trq of the motor is close to zero and flat. This means that holding the electrical phase angle Be near −90 degrees can keep the torque of the motor near zero even when the electrical phase angle Be fluctuates. It is known that there is a relation expressed by Expression 6 among the electrical phase angle Be, the total current Ia, the d-axis current Id, and the q-axis current Iq:

$$Id = -Ia \times \sin(Be), Iq = Ia \times \cos(Be)$$ [Expression 6]

When the electrical phase angle Be is near −90 degrees, the q-axis current Iq is near zero and the d-axis current Id has a positive value. To put it the other way around, if the q-axis current can be kept near zero and the d-axis current Id can be kept at a positive value, the electrical phase angle Be can be kept near −90 degrees and the output torque of the motor can be kept near zero.

When one of the current sensors 7 becomes unusable in a state where the angular speed W of the motor 6 is lower than the predetermined lower-limit angular speed Wmin, the controller 20 controls the motor 6 with the d-axis voltage command value Vdc set to zero and the q-axis voltage command value set to a non-zero value such that the d-axis current Id assumes a positive value. Thus, controlling the motor 6 can keep the output torque of the motor 6 low while a current flows thereto.

Since the q-axis voltage Vq is given by Expression 3, when the angular speed W is lower than the lower-limit angular speed Wmin, the controller 20 can set the d-axis voltage command value Vdc to zero and set the q-axis voltage command value Vqc by the following Expression 7:

$$Vqc = W \times Ld \times Id + W \times PHI = Ce + W \times PHI$$ [Expression 7]

Symbol Ce is a positive constant larger than the predetermined lower-limit constant Cmin. Expression 7 is the same as Expression 1 shown earlier. Giving the q-axis voltage command value Vqc by Expression 1 can hold the d-axis current Id at a positive value, and as a result, the output torque of the motor 6 can be kept at zero or low while a current flows to the motor 6.

The controller 20 identifies the unusable current sensor while executing the zero-torque control. One example of how to find the unusable current sensor is as follows.

It is known that there is a relation expressed by the following Expression 8 between currents Iu, Iv, Iw of the respective three phases and the total current Ia flowing through the stator:

$$Iu^2 \times Iv^2 \times Iw^2 = 3/2 \times Ia^2$$ [Expression 8]

The u-phase current Iu can be obtained by Iu=−(Iv+Iw). Therefore, Expression 9 can be obtained by representing the u-phase current Iu in Expression 8 by the v-phase current Iv and the w-phase current Iw:

$$(Iv+Iu)^2 \times Iv^2 \times Iw^2 = 3/2 \times Ia^2$$ [Expression 9]

An expression similar to Expression 9 can be obtained by representing the v-phase current Iv by the u-phase current Iu and the w-phase current Iw. A similar expression can also be obtained by representing the w-phase current Iw by the u-phase current Iu and the v-phase current Iv. The total current Ia flowing through the stator is equal to the input current to the inverter 5. The input current to the inverter 5 can be measured by the current sensor 12. The controller 20 estimates, from the measurements of two of the current sensors 7, the phase current corresponding to the other current sensor 7. When the sum of squares of the three phase currents obtained from the measurements of the two current sensors 7 is equal to three halves of the square of the input current Ia to the inverter 5, the controller 20 determines that the two current sensors 7 are usable. On the other hand, when the sum of squares of the three phase currents obtained from the measurements of the two current sensors 7 is different from three halves of the square of the input current Ia, the controller 20 determines that one of the two current sensors 7 is unusable.

The controller 20 can identify the unusable current sensor by using Expression 9 and two expressions equivalent thereto.

After identifying the unusable current sensor, the controller 20 estimates the phase current corresponding to the unusable current sensor from the measurements of the two usable current sensors and resumes the current feedback control.

While specific examples of the present disclosure have been described above, these examples merely illustrate and do not limit the scope of the claims. The scope of the technique described in the claims include various modifications and changes made to the specific examples shown above. The technical elements described in this specification or the drawings exhibit technical usefulness independently as well as in various combinations, and the combinations are not limited to those described in the claims as filed. The technique illustrated in this specification or the drawings can fulfill more than one purpose at the same time and proves to be technically useful just by fulfilling one of the purposes.

What is claimed is:

1. An electric vehicle comprising:
   a traction motor;
   an inverter that supplies the motor with an alternating current;
   three current sensors that respectively measure current of each phase of the alternating current output by the inverter, the alternating current being a three phase alternating current; and
   a controller that controls the motor through the inverter, the controller being configured to, when one of the current sensors becomes unusable, identify the unusable current sensor while controlling the motor with a d-axis voltage command value set to zero and a q-axis voltage command value set to a non-zero value.

2. The electric vehicle according to claim 1, wherein the controller is configured to, when one of the current sensors becomes unusable in a state where an angular speed of the motor is lower than a predetermined lower-limit angular speed, identify the unusable current sensor while controlling the motor with the d-axis voltage command value set to zero, the q-axis voltage command value set to a non-zero value, and a d-axis current being a positive value.

3. The electric vehicle according to claim 1, wherein the controller is configured to assign the q-axis voltage command value Vqc by:

Vqc=Ce+W×PHI, wherein
W is an angular speed of the motor;
PHI is intensity of a magnetic field of a rotor of the motor; and
Ce is a constant larger than a predetermined positive lower-limit constant Cmin.

4. The electric vehicle according to claim 1, wherein the controller is configured to determine that one of the current sensors is unusable when a sum of measurements of the three current sensors is not zero.

5. The electric vehicle according to claim 1, wherein the controller is configured to:
from a first measurement of a first current sensor and a second measurement of a second current sensor of the current sensors, estimate a third estimation of a current of a phase corresponding to a third current sensor of the current sensors;
when a sum of square of the first measurement, square of the second measurement and square of the third estimation is equal to three halves of a square of an input current to the inverter, determine that the first current sensor and the second current sensor are usable; and
when the sum of square of the first measurement, square of the second measurement and square of the third estimation is different from three halves of the square of the input current, determine that one of the first current sensor and the second current sensor is unusable.

6. A diagnosis method for an electric vehicle including a traction motor, an inverter that supplies the motor with an alternating current, three current sensors that respectively measure current of each phase of the alternating current output by the inverter, the alternating current being a three phase alternating current, and a controller that controls the motor through the inverter, the diagnosis method comprising, when one of the current sensors becomes unusable, identifying the unusable current sensor while controlling the motor with a d-axis voltage command value set to zero and a q-axis voltage command value set to a non-zero value.

7. The diagnosis method according to claim 6, wherein, when one of the current sensors becomes unusable in a state where an angular speed of the motor is lower than a predetermined lower-limit angular speed, the unusable current sensor is identified while the motor is controlled with the d-axis voltage command value set to zero and the q-axis voltage command value set to a non-zero value and a d-axis current being a positive value.

8. The diagnosis method according to claim 6, wherein the q-axis voltage command value Vqc is given by:

Vqc=Ce+W×PHI, where
W is an angular speed of the motor;
PHI is intensity of a magnetic field of a rotor of the motor; and
Ce is a constant larger than a predetermined positive lower-limit constant Cmin.

9. The diagnosis method according to claim 6, further comprising, when a sum of measurements of the three current sensors is not zero, determining that one of the current sensors is unusable.

10. The diagnosis method according to claim 6, further comprising:
from a first measurement of a first current sensor and a second measurement of a second current sensor of the current sensors, estimating a third estimation of a current of a phase corresponding to a third current sensor of the current sensors;
when a sum of square of the first measurement, square of the second measurement and square of the third estimation is equal to three halves of a square of an input current to the inverter, determining that the first current sensor and the second current sensor are usable; and
when the sum of square of the first measurement, square of the second measurement and square of the third estimation is different from three halves of the square of the input current, determining that one of the first current sensor and the second current sensor is unusable.

* * * * *